C. C. HARRIS.
RAKE.
APPLICATION FILED OCT. 29, 1914.
1,162,055. Patented Nov. 30, 1915.
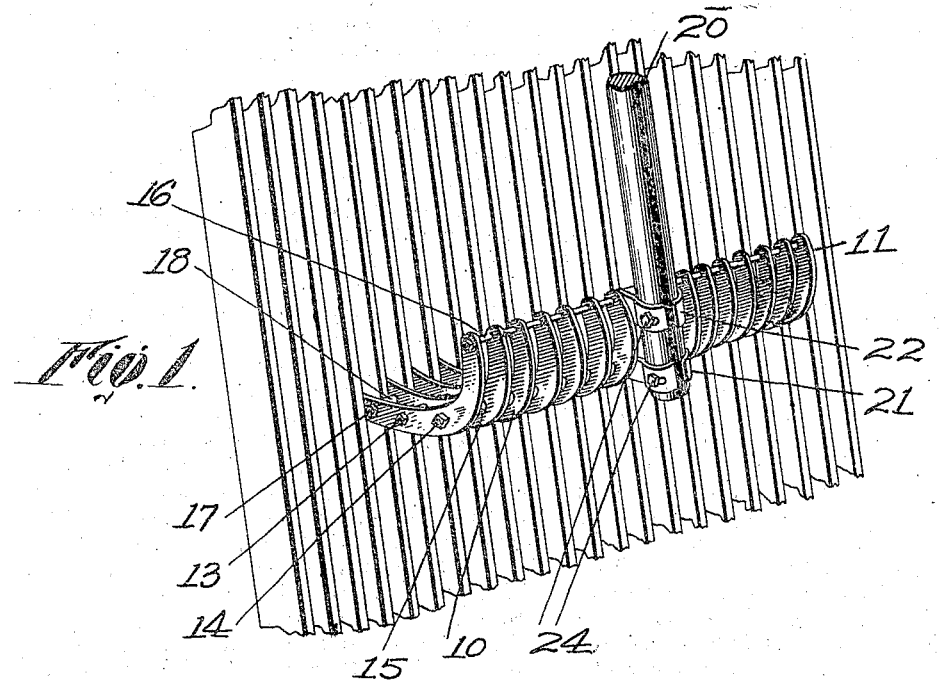
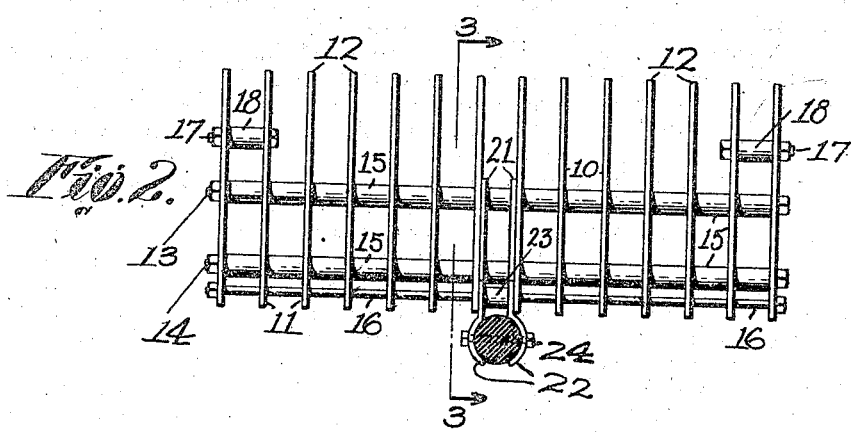
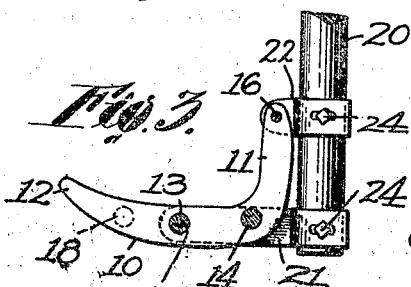
Witnesses:
Inventor
C. C. Harris

UNITED STATES PATENT OFFICE.

CARL C. HARRIS, OF ORANGE, MASSACHUSETTS.

RAKE.

1,162,055.

Specification of Letters Patent.

Patented Nov. 30, 1915.

Application filed October 29, 1914. Serial No. 869,306.

*To all whom it may concern:*

Be it known that I, CARL C. HARRIS, a citizen of the United States, residing at Orange, in the county of Franklin and State of Massachusetts, have invented a new and useful Rake, of which the following is a specification.

This invention relates to a rake and although particularly designed for use in cleaning screens used in connection with water wheels and the like, some of the features of the invention are capable of use on many kinds of rakes, such as garden and lawn rakes.

The principal objects of the invention are to provide an improved form of rake teeth which can be made of stamped steel and be practically unbreakable; to provide a construction which will permit of the assembling of the teeth in a comparatively inexpensive manner and will also permit of their being assembled so as to be at any desired distance apart to accommodate screens of different gage; to provide a construction which will be extremely strong and rigid; to provide the teeth with a convenient and inexpensive form of back for holding the material dislodged by the rake and thus increasing its capacity; to provide an improved form of stops for allowing the rake to be more readily drawn over the screen bars; and to provide improved handle attaching means.

Further features of the invention will appear hereinafter.

Reference is to be had to the accompanying drawings in which—

Figure 1 is a perspective view of a rake, constructed in accordance with this invention and shown in position for cleaning a screen; Fig. 2 is a plan of the rake head showing the handle in section, and Fig. 3 is a sectional view on the line 3—3 of Fig. 2.

Although as I have stated features of this invention are capable of general use I have shown them as applied to a rake particularly adapted for cleaning screens and will describe this particular embodiment of the invention in detail. The rake is made up of a plurality of teeth each consisting of a body 10 and a back 11, the body having a point 12 at the end opposite the back. Each of these teeth consists of a flat piece of sheet steel stamped out to shape and consequently is substantially unbreakable. The teeth are arranged in parallel planes so that their width is along the direction of motion, transverse to the longitudinal dimension of the rake head. In this way the teeth can be designed so as to have any desired amount of material in this direction and any desired strength.

According to the preferred embodiment of this invention the teeth are secured together by means of two rods 13 and 14 parallel with each other and extending longitudinally of the rake head and transversely with respect to the teeth. These rods can be spot welded to the teeth if desired but in the form shown the teeth are perforated and the rods pass through the perforations. Each rod of course has a head on one end and a nut on the other for firmly securing the parts together and the teeth are separated from each other by tubular separators 15. The teeth abut against the square ends of these separators and they are held firmly in position. I prefer to employ two of these rods 13 and 14 in order to secure an absolutely rigid and firm construction. In addition to these the backs 11 are perforated at their ends and another rod 16 passes through them, though the separators are not necessarily used at this point.

For the purpose of limiting the distance to which the rake teeth can project into the screen, stops are provided preferably between the two end teeth on each end in the form shown. Each of these stops consists of a shorter rod 17, having a head on one end and a nut on the other, passing through perforations in the two teeth and an additional separator 18 placed on the rod between the teeth. When the nut is screwed up these two teeth are firmly secured and the stop securely fixed in position in the same manner as the teeth are secured together throughout the length of the rake by the rods 13 and 14. It is to be noted that as the bearing surface of this stop is cylindrical it affords very little resistance to the drawing of the rake over the screen bars and does not wear the latter irregularly or to any great extent. Moreover these stops are the parts of the rake which wear the most in actual use and the part more likely to give out.

In order to very greatly increase the life of the rake the only thing that is necessary is to loosen the nuts on the rods 17 and turn the separators 18 to another position or replace them by new ones. It is to be noted that this separator 18, located as it is near the points of the two end teeth, serves to keep those two teeth in fixed position. This is an important feature because in actual practice it is generally the end tooth that gets bent and the bending of the end tooth in a rake used on a screen would render the rake useless until the tooth was restored to normal condition. But with this construction the liability of bending is very greatly reduced.

For the purpose of securing the handle 20 a pair of clips 21 are provided preferably adjacent to the two central teeth and in this case the separating members are reduced in length sufficiently to securely hold these clips in fixed position. Another pair of clips 22 are mounted on the rod 16 and are free to turn thereon, being separated by a separating member 23. With the clips 21 in rigid position and the clips 22 capable of turning it will be obvious that the latter can be moved to the exact position necessary in order to secure the handle 20 to them by means of bolts 24.

It will be seen therefore that an extremely rigid and durable construction is secured which is particularly adapted for the cleaning of screens and that many features of the invention are also applicable to rakes of all kinds.

Although I have illustrated and described only a single embodiment of the invention, I am aware of the fact that it can be carried out in many other ways without departing from the scope of the invention as expressed in the claims. Therefore I do not wish to be limited to the exact details of construction herein shown and described or the use of all features of the invention in screen rakes, but—

What I do claim is:—

1. As an article of manufacture, a rake comprising a head having a plurality of rigid teeth, each comprising a flat member having a body provided with a toothed point at one end and having a back at the other end substantially at right angles to the body and in the same plane, parallel rods passing through the body of said teeth transversely to the plane thereof for securing them rigidly together and having means thereon for holding them apart, a third rod passing through the ends of said backs, a handle parallel with said backs, and means connected to said third rod and to one of the first named rods for holding the handle.

2. As an article of manufacture, a rake comprising a head having a plurality of rigid teeth, each tooth consisting of a flat member having a body provided with a tooth point at one end and having a back at the other end substantially at right angles to the body, and in the plane thereof, a pair of parallel rods passing through the bodies of said teeth transverse to the planes thereof for securing them rigidly together and spacing them apart, a third rod passing through the ends of said backs, a pair of handle clips rigidly supported by the first two rods and a pair of handle clips supported by the last named rod for holding a handle.

3. As an article of manufacture, a screen rake having a series of parallel teeth and a back for connecting the teeth together, the two teeth at each end having a stop located between them at a point substantially halfway between the toothed points and the back, and means for rigidly securing said stops to said end teeth.

4. As an article of manufacture, a screen rake having a series of parallel teeth, a transverse back, and means extending through said teeth for holding them together near the back ends of the teeth, two of said adjacent teeth having a fixed rod extending across the space between them at a point part way between the back and points of the teeth for limiting the distance by which the rake teeth can enter the screen to be cleaned.

5. As an article of manufacture, a rake for cleaning water wheel screens having teeth provided with free spaces between them, certain of said adjacent teeth having a rod extending through them at a point between the points and rear ends of the teeth, a tubular separator on said rod between the teeth, and means for rigidly securing the rod and separator in position, said separator being materially spaced from the ends of the teeth.

6. As an article of manufacture, a screen rake comprising a plurality of independent teeth, and having means for securing them together and spacing them apart, two pairs of said teeth having readily removable and replaceable fixed stops between them near the points thereof and the rest of the teeth having free spaces between them clear to the backs thereof.

In testimony whereof I have hereunto set my hand, in the presence of two subscribing witnesses.

CARL C. HARRIS.

Witnesses:
 HAROLD W. BAKER,
 WILLIAM A. BAINES.